United States Patent [19]

Jamieson

[11] 4,442,401

[45] Apr. 10, 1984

[54] NEGATIVE COUPLED INDUCTORS FOR POLYPHASE CHOPPERS

[75] Inventor: Robert S. Jamieson, Pasadena, Calif.

[73] Assignee: California Institute of Technology, Pasadena, Calif.

[21] Appl. No.: 338,121

[22] Filed: Jan. 8, 1982

[51] Int. Cl.³ .......................................... H02M 3/135
[52] U.S. Cl. .................................. 323/351; 323/272; 333/181; 363/124
[58] Field of Search ............... 323/222, 271, 272, 282, 323/351; 363/47, 48, 124; 333/181, 182

[56] References Cited

U.S. PATENT DOCUMENTS

| | | | |
|---|---|---|---|
| 3,099,786 | 7/1963 | Friedrich et al. | |
| 3,331,987 | 7/1967 | Powell | 315/206 |
| 3,588,664 | 6/1971 | Akamatsu | 363/124 |
| 3,699,358 | 10/1972 | Wilkinson | 323/272 |
| 3,915,048 | 10/1975 | Stich | 84/1.14 |
| 4,034,282 | 7/1977 | Renard | 363/124 |
| 4,184,197 | 1/1980 | Ćuk et al. | 363/16 |
| 4,293,812 | 10/1981 | Kubach et al. | 323/272 |

FOREIGN PATENT DOCUMENTS

| | | | |
|---|---|---|---|
| 55-2338 | 1/1980 | Japan | 323/351 |
| 313203 | 10/1971 | U.S.S.R. | 323/272 |

OTHER PUBLICATIONS

IBM Technical Disclosure Bulletin, vol. 7, No. 7, p. 569, Dec. 1964.
Dewan et al., *Power Semiconductor Circuits*, Wiley & Sons, pp. 415-426.
Gyugyi et al., *Static Power Frequency Changers*, Wiley & Sons, pp. 114-117.
Ćuk et al., "Coupled-Inductor and Other Extensions of a New Optimum Topology Switchings DC-to-DC Converter," IEEE IAS Mtg., Oct. 1977.
Ripple, "A New Coupled Inductor Two-Phase Switching Regulator Improves Device Utilization," Powercon 7, Mar. 24–27, 1980.

Primary Examiner—William H. Beha, Jr.
Attorney, Agent, or Firm—Jackson, Jones & Price

[57] ABSTRACT

A technique for negatively coupling the outputs of polyphase choppers is disclosed, wherein the output inductance of each phase is divided into two windings, and each winding is negatively coupled to a corresponding winding of a neighboring phase. In a preferred embodiment for a three-phase chopper circuit, the output inductance of phase A is divided into windings 100 and 102, the output inductance of phase B is divided into windings 110 and 112, and the output inductance of phase C is divided into windings 120 and 122. Pairs of windings 100 and 110, 112 and 120, and 102 and 122 are respectively disposed in transformers arranged for negatively coupling the windings of each pair.

6 Claims, 2 Drawing Figures

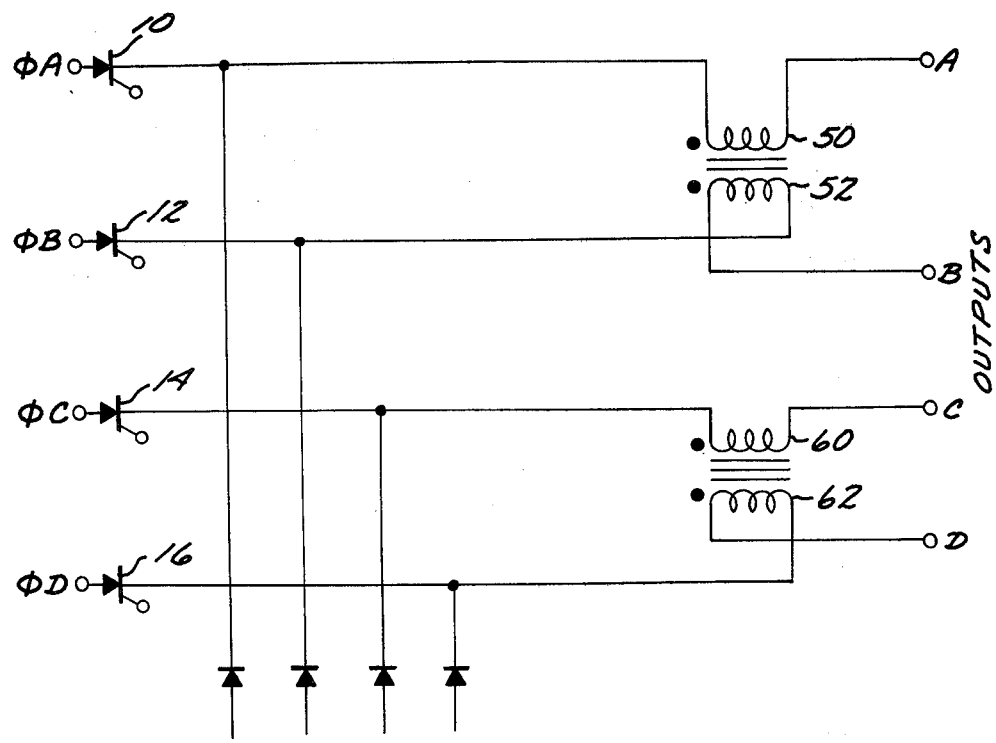
PRIOR ART
FIG. 1
FIG. 2
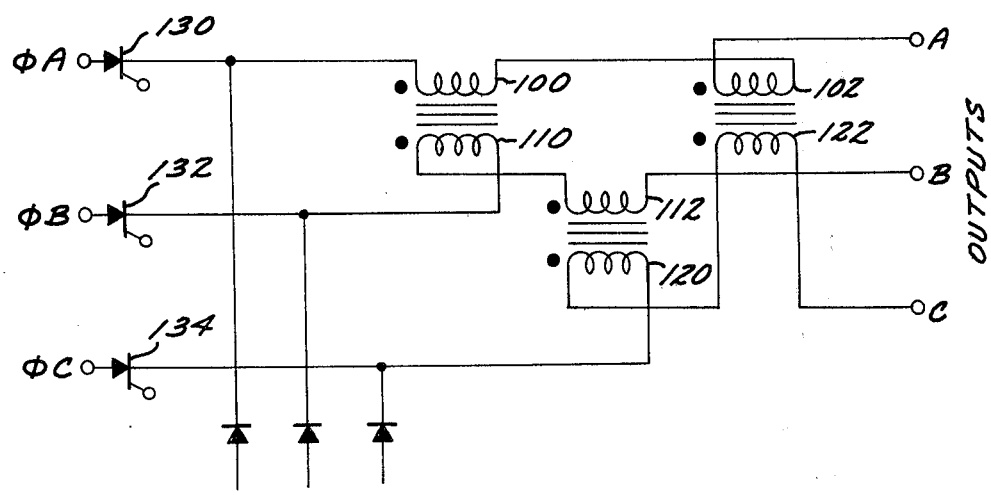

NEGATIVE COUPLED INDUCTORS FOR POLYPHASE CHOPPERS

ORIGIN OF THE INVENTION

The invention described herein was made in the performance of work under a NASA contract and is subject to the provisions of Section 305 of the National Aeronautics and Space Act of 1958, Public Law 85-56 (72 Stat. 435; 42 USC 2457).

FIELD OF THE INVENTION

The present invention relates to improvements in power handling circuits, and more particularly to circuitry utilizing polyphase choppers.

BACKGROUND OF THE INVENTION

This invention relates to an improvement to the circuitry described in pending application, Ser. No. 240,453, for "Unity Power Factor Switching Regulator" filed in the United States Patent and Trademark Office on Mar. 4, 1981 by Wally E. Rippel, and assigned to the same assignee as the present application. The disclosure of that application is incorporated herein by reference. Mr. Rippel's work was also the subject of the paper "A New Coupled Inductor Two - Phase Switching Regulator Improves Device Utilization," which applicant understands was presented at Power Con 7, March 24-27, 1980, in San Diego, Calif.

Also pertinent to the invention of the present application is U.S. Pat. No. 4,184,197 for a "DC-to-DC Switching Converter," issued to S. M. Cuk and R. D. Middlebrook, and assigned to the same assignee as the present application (hereinafter referred to as the "Cuk et al" patent). Cuk and Middlebrook's work was also the subject of the paper "Coupled-Inductor and Other Extensions of a New Optimum Topology Switching DC-To-DC Converter," which applicant understands was presented at the IEEE Industry Applications Society Annual Meeting, Oct. 2-6, 1977, at Los Angeles, Calif.

Cuk et al approached the problems of design of a dc-to-dc converter by deriving a new converter topology to achieve reduction of the number of circuit components required for the apparatus. Very generally, Cuk et al utilizes one inductor in series with the input source, another inductor in series with the load, and an energy transferring means having storage capabilities connected between the two inductances. The energy transferring means comprising a storage capacitor in series with the two inductors and a switch for alternatively connecting the junction between the first inductance and storage capacitance to ground for the source, and connecting the junction between the storage capacitor and the second capacitance to ground for the load, (e.g. FIG. 5 of Cuk et al). Cuk et al describe embodiments wherein negative inductive coupling between the input and output is achieved, and the input and/or output ripple reduced (e.g. FIGS. 8(a) and 8(1-3), and columns 6, line 45 to column 9, line 38.

A disadvantage of the circuit topology described in Cuk et al is the continued requirement for a power handling storage capacitor (see for example, capacitors 14 in FIGS. 8a and 8b). Such power capacitors are difficult to manufacture, expensive and are subject to reliability problems. The Rippel application describes a circuit which does not require the power capacitor and deals with the specific application of high speed switching regulators to battery charging circuits. One feature of the Rippel application is the use of negative inductive coupling between pairs of converters 180° out of phase, to reduce peak currents through the switches while at the same time reducing the inductor size and mass.

Rippel describes particular arrangements for negatively coupling the output inductors in pairs, e.g. at page 15, line 8 to line 17, line 30, and the arrangements illustrated in FIGS. 8a and 8b. Rippel teaches that a conventional multiphase converter (shown in Rippel's FIG. 2) achieves complete cancellation of the first N-1 current harmonics at each of the three external modes, when the duty cycles of each of the N converters are equal and symmetrically staggered in time. With the negative coupling provided between pairs of inductors in what would otherwise be a conventional multiphase converter, Rippel shows that a combination of improved current form-factors and reduced total inductor masses is made possible. An improved power to weight ratio is achieved while peak switching currents and inductor losses are reduced. Rippel performs an analysis of the current harmonics flowing through each of N inductors to demonstrate that negative coupling reduces the ripple currents through the inductors, (e.g. at page 18, line 8 through page 25, line 14).

The negative coupling facet of the Rippel application is of considerable commercial interest, in that it does allow a reduction in inductor size and cost. However, the Rippel coupling technique suffers a significant disadvantage. Specifically, Rippel teaches only the coupling of one chopper to another, and consequently is limited to choppers with an even number of phases, such as two-phase (push-pull) choppers, four-phase choppers, and so on. Such choppers are seldom used; the great majority of polyphase choppers and inverters are three phase versions. To obtain three phases with the Rippel technique, one could use a six-phase (star) chopper and convert to three phases by use of an isolation transformer. This would add complexity and extra cost, with a corresponding decline in reliability.

Applicant is aware of other references which relate to the subject matter of this application. The text, "Power Semiconductor Circuits," by S. B. Dewan and A. Straughen, published by John Wiley & Sons, discusses, at pages 415-426, harmonic reduction in multiphase inverters by transformer connection. U.S. Pat. No. 3,915,048 discloses an electrical guitar circuit wherein negatively coupled inductors 18 and 19 are provided in a hum-bucking arrangement, and also in a frequency control circuit 15.

Other references typical of the art are U.S. Pat. Nos. 4,034,282 (for a chopper-stabilized power supply), 3,331,987 (for an apparatus including a bucking transformer for operating electrical discharge lamps), and 3,099,786 (for a control for an electrical power translation system). Another reference of interest is the book "Static Power Frequency Chargers," by L. Gyugji and B. R. Pelly, published by John Wiley & Sons, (e.g. at pp. 114-117).

SUMMARY OF THE INVENTION

The present invention solves the disadvantages of the Rippel coupling technique by dividing the output inductors of the Rippel chopper into two series windings, each negatively coupled to adjacent phases to extend the negative coupling harmonic reduction feature to any number of phases.

In the preferred embodiment for a three phase chopper circuit, each chopper phase is coupled to the load by two series connected windings. One of the first phase windings is negatively coupled to one winding of the second phase, and the other first phase winding is negatively coupled to one winding of the third phase. The second winding of the second phase is negatively coupled to the second winding of the third phase.

BRIEF DESCRIPTION OF THE DRAWINGS

FIG. 1. is a simplified schematic of the ouput portion of the prior art boost chopper output circuitry of the Rippel application.

FIG. 2 is a simplified schematic of the coupling system of the present invention, adapted to accommodate three phases.

DETAILED DESCRIPTION OF THE INVENTION

The present invention comprises a novel coupling technique for negative coupling of the outputs of polyphase choppers to achieve cancellation of undesirable harmonic energy. The following description of the invention is provided to enable any person skilled in the power conversion art to make and use the invention, and sets forth the best mode contemplated by the inventor of carrying out his invention. Various modifications to the preferred embodiment, however, will be readily apparent to those skilled in the art, and the generic novel principles defined herein may be applied to other embodiments. Thus, the present invention is not intended to be limited to the embodiment shown, but is to be accorded the widest scope consistent with the principles and novel features disclosed herein.

Referring now to FIG. 1, a simplified schematic of the output circuitry of the prior art fourphase boost chopper of the Rippel application is disclosed. The input circuitry and circuitry for controlling the switching of SCRs 10, 12, 14 and 16 is disclosed in Rippel, and is not shown as it forms no part of the present invention. In this circuitry, the output inductances 50, 52, 60 and 62 for phases A, B, C and D are respectively coupled together as transformer windings 50 and 52, and 60 and 62, each set of windings with opposite mutual coupling. This method of coupling allows only for pairs of transformers, and consequently coupling of only even numbers of phases is possible with this technique.

In FIG. 2, a simplified schematic of the coupling system of the present invention is shown, adapted to accommodate three phases A, B and C. As with FIG. 1, the input circuitry and circuitry for regulating the switching of SCRs 130, 132 and 134 is not shown, as it is conventional and forms no part of the present invention. In this embodiment, the output inductances for each of the phases is divided into two windings. Thus, the inductance for phase A is divided into windings 100 and 102, the inductance for phase B is divided into windings 110 and 112, and the inductance for phase C is divided into windings 120 and 122.

Windings 100 of phase A are negatively coupled to windings 110 of phase B, and windings 102 are negatively coupled to windings 122 of phase C. In the same fashion, windings 112 of phase B are negatively coupled to windings 120 of phase C. Hence, each phase has been negatively coupled to the other two phases in "round-robin" fashion and the coupling is repeated symmetrically around the three phases.

Although the present invention does require additional transformers, each transformer is smaller, and it is expected that the total volume of iron and copper required for the coupling elements is similar to that required in the Rippel coupling technique.

While experimental verification of the advantages of the present invention has to date not been attempted, it is apparent that the present invention will reduce the peak current and ripple through the output inductors although the harmonic content of the output waveform undoubtedly differ in some respects from that achieved by the coupling technique of the Rippel application.

While only a three phase embodiment of the present invention is shown, the technique may readily be adapted to circuits having greater than three phases, simply by negatively coupling each phase to its adjacent neighboring phases in rotation, in the manner shown, for example of phase B in FIG. 2.

As in the Rippel application, the coupling factors and the inductor design may be optimized, either experimentally or empirically, to achieve the most efficient component utilization and design for a particular application.

While the coupling technique of the present invention has been particularly described in connection with the boost multiphase chopper regulator described in the pending Rippel application, the invention may be utilized in other applications, such as inverters, cycloconverters, converters and the like.

What is claimed is:

1. In a multiphase chopper wherein the output of each chopper is coupled via an output inductance to the load, the improvement wherein:
   the output inductance of each phase is comprised of a first inductance and a second inductance, and each of said first inductances and said second inductances of each phase are respectively negatively coupled to a corresponding one of said output inductances in separate adjacent neighboring phases.

2. The improvement of claim 1 wherein each of said first and second inductances is equivalent.

3. The improvement of claim 1 wherein each pair of said negatively coupled inductors comprises a transformer means having first and second windings and wherein said transformer is arranged to negatively couple said windings.

4. A three phase circuit comprising:
   first, second and third switching regulators;
   first and second windings coupling said first regulator to the load;
   third and fourth windings coupling said second regulator to the load;
   fifth and sixth windings coupling said third regulator to the load;
   and wherein said first and third windings, said second and fifth windings, and said fourth and sixth windings are respectively negatively coupled to one another.

5. The circuit of claim 4 wherein said first and third windings are arranged in a first transformer adapted for negative coupling of said windings, said second and fifth windings are arranged in a second transformer adapted for negatively coupling said windings, and said fourth and sixth windings are each arranged in a transformer adapted for negatively coupling said windings.

6. A three phase chopper circuit comprising:

first, second and third chopper means, each inductively coupled to the load;

first, second and third transformer means, each including at least two windings and adapted for opposite mutual coupling to said two windings;

said transformers being arranged to couple said chopper means to the load, said first chopper means being coupled to the load by the series connection of a first winding of said first transformer to a first winding of said second transformer, said second chopper means being coupled to the load by the series connection of a second winding in said first transformer and a first winding in said third transformer, and said third chopper means being coupled to the load by the series connection of a second winding in said third transformer and a second winding in said second transformer.

* * * * *